June 30, 1959  L. A. RUNTON  2,892,748
HIGH SPEED ENDLESS BELT
Filed Feb. 14, 1956  2 Sheets-Sheet 2
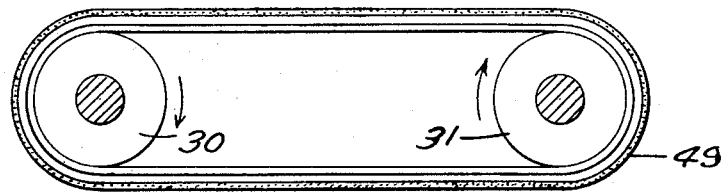
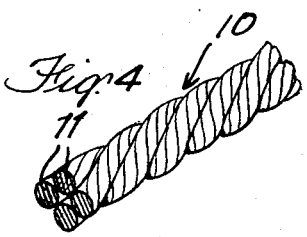
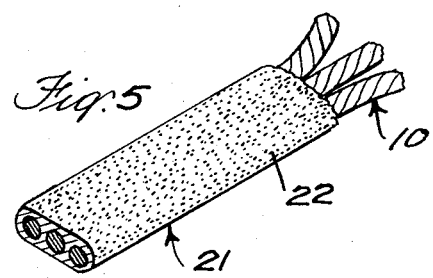
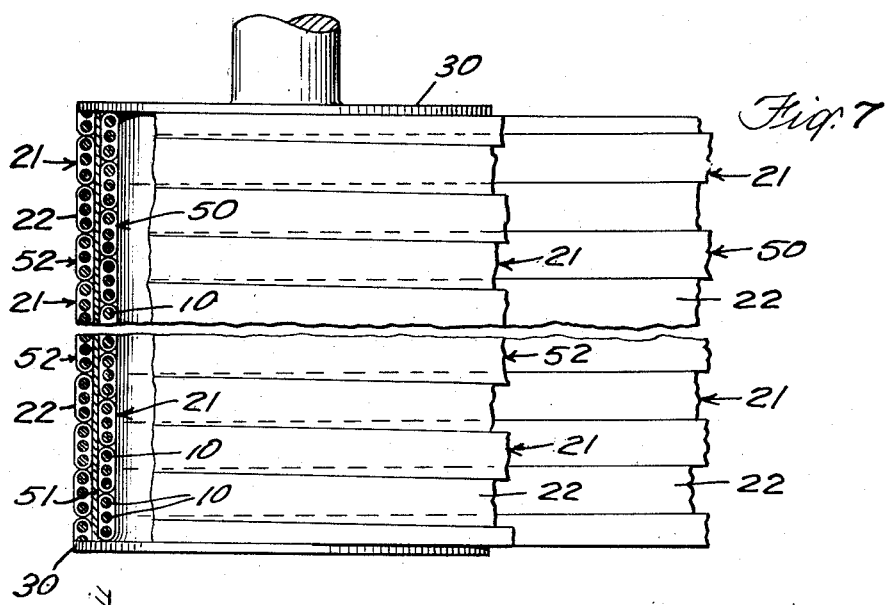
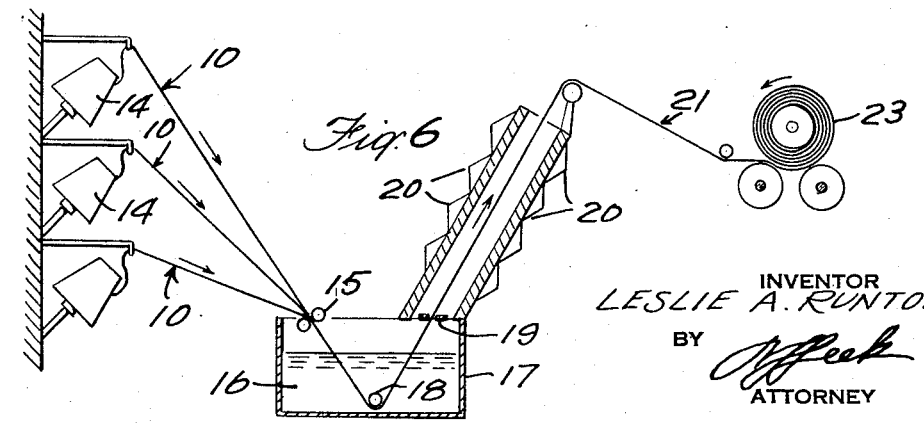
INVENTOR
LESLIE A. RUNTON
BY
ATTORNEY

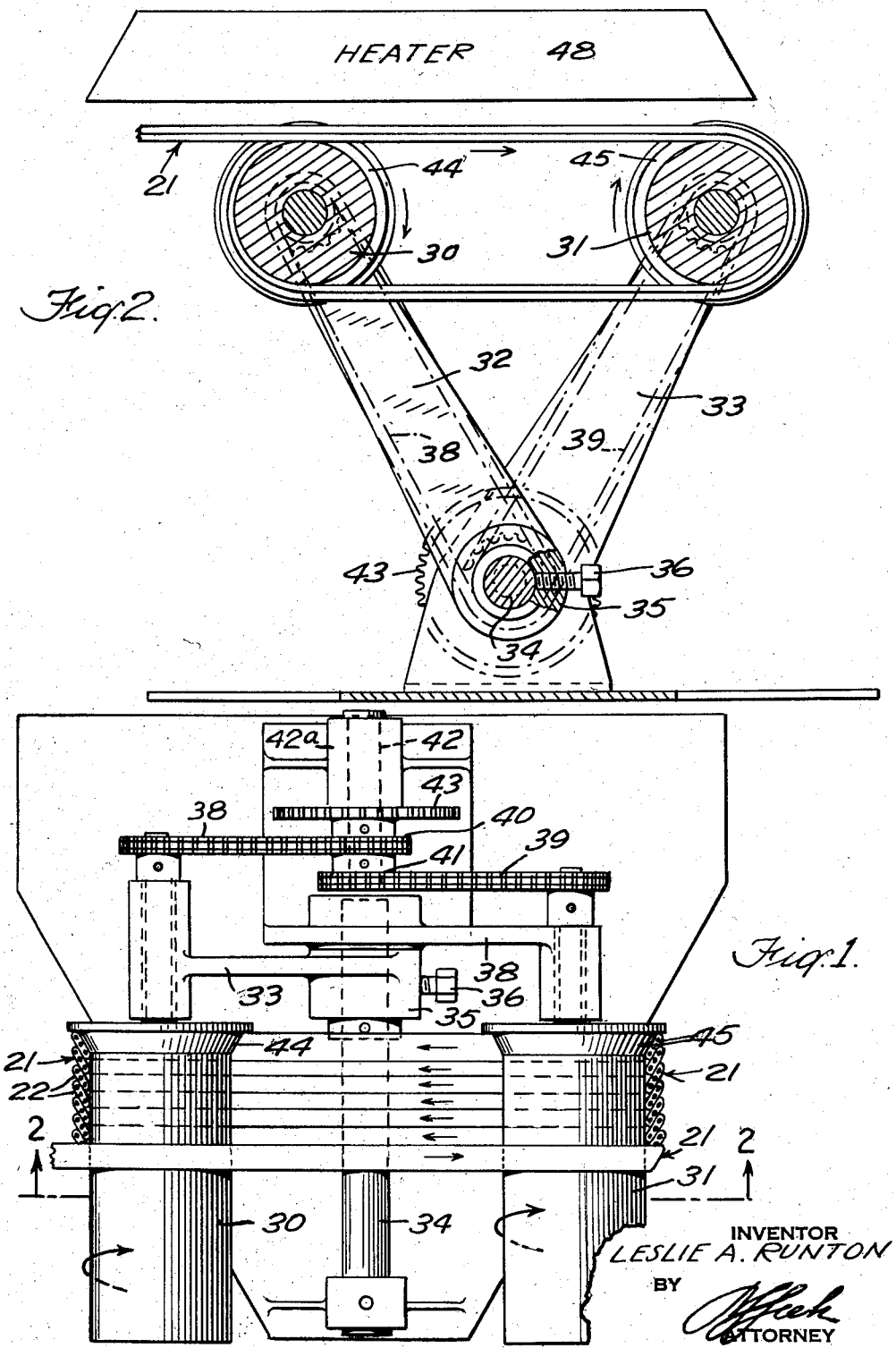

United States Patent Office 2,892,748
Patented June 30, 1959

2,892,748

HIGH SPEED ENDLESS BELT

Leslie A. Runton, Middle Haddam, Conn., assignor to The Russell Manufacturing Company, Middletown, Conn., a corporation of Connecticut Application February 14, 1956, Serial No. 565,353

2 Claims. (Cl. 154—52.1)

This invention relates to endless belts and to a method of producing the same and in particular to the manufacture of high speed belts for light duty.

In the manufacture of such belts it is customary to weave a tubular fabric and to vulcanize sections slit from the tube so as to produce narrow endless belts. However, due to the characteristics of the looms used for weaving such tubes, and in particular to the manner in which the usual lay beats up the filling, which becomes the longitudinal thread in the endless belt, the thread does not assume an undistorted parallel arrangement. This gives the belt a tendency to shift sideways or even to run off of the pulleys when it is operated at high speed.

An object of the present invention is to eliminate these difficulties and to provide an endless high speed belt in which the longitudinal yarns are parallel to each other and undistorted, thereby permitting the belt to be operated at high speed for long periods of time.

Another object is to provide an improved method for making such a belt.

More specifically, in accordance with the present invention suitable single yarns are first twisted into plies and a plurality of plied yarns are cabled to form a cord. A plurality of such cords, for example three cords, are dipped in a plastic adhesive such as a plastisol and are laid in parallel relationship and dried to form a bonded flat ribbon.

The yarns used in producing the cords are preferably of a dimensionally stable synthetic type, such as Fortisan, a continuous filament cellulose acetate yarn stretched, steamed and saponified in caustic to form a highly oriented regenerated cellulose yarn having high dimensional stability or a prestretched nylon, or a prestretched high tenacity rayon tire cord. Such yarns are dimensionally stable under the stresses encountered in subsequent use of the high speed belt.

The flat ribbon thus formed is wound on mandrels which are set at the proper spacing to make the endless belt of the length desired. The ribbon is advanced axially of the mandrels as it is wound to build up the belt to the desired width, after which the end of the ribbon is secured to the adjacent convolution and the belt is bonded by the application of suitable heat with or without an additional coating of plastic material.

The belt may be built up in a plurality of layers if desired and may be covered by a layer of fabric, or layers of fabric may be interposed between the various layers of the ribbon, depending upon the type of belt desired.

A specific type of apparatus suitable for making the above described belt is shown in the drawing wherein:

Fig. 1 is a top plan view of the supporting mandrels showing a belt being wound thereon and with a portion of the belt broken away for clarity.

Fig. 2 is a vertical section taken on the line 2—2 of Fig. 1;

Fig. 3 is a side elevation of the finished belt with a fabric covering showing the belt while still on the mandrels;

Fig. 4 is a detail view of the cabled cord to be used in forming the belt;

Fig. 5 is a detail view of a ribbon composed of three parallel cabled cords as used in making the belt;

Fig. 6 is a diagrammatic view illustrating the method of producing the ribbon of Fig. 5; and Fig. 7 is an enlarged broken plan view similar to Fig. 1 but showing a two ply belt with an intervening layer of fabric.

Referring first to Figs. 4, 5 and 6 a cabled cord 10 is shown as composed of four multi-ply yarns 11. The yarns 11 as above described are composed of prestretched synthetic filaments having dimensional stability, that is, having negligible stretch under the tension to be encountered in normal use.

Referring to Fig. 6 a plurality of the cords 10, are shown as fed from packages 14 between feed rolls 15 into a bath 16 of suitable plastic material contained in tank 17. The cords are passed around a guide 18 in the solution and upward through a forked arm 19 serving as a guide to lay the cords in parallel relationship and to determine the thickness of the coating of plastic material which is picked up from the bath 16, after which they are passed through a drying zone, shown as formed by a bank of infra red lights 20, wherein the coating is dried to bond the cords together and form a flat ribbon 21 composed of parallel cords 10 having a bonding coating 22 as shown in Fig. 5. This ribbon 21 may be wound on a roll 23 for use in producing the belt to be described.

Referring now to Figs. 1 and 2 mandrels 30 and 31 are shown as mounted on arms 32 and 33 respectively. The arm 33 is fixed to a rod 34. The arm 32 is adjustably secured to said rod 34 by means of a hub 35 and set screw 36 which is so arranged that the spacing between the mandrels 30 and 31 may be varied as desired. The mandrels 30 and 31 are shown as driven by chains 38 and 39 respectively which are driven from sprockets 40 and 41 fixed on a shaft 42 rotatably mounted in a bracket 42a and driven by suitable means shown as a sprocket 43.

The mandrels 30 and 31 are shown as provided with cone-shaped flanges 44 and 45 respectively at their inner ends for the purpose to be described.

In forming the belt the ribbon 21 is laid around the mandrels 30 and 31 and against the flanges 44 and 45 to form a loop. The mandrels 30 and 31 are driven by the means above described and the ribbon 21 is fed along in successive partially overlapping convolutions to build up the layer to the width desired for the belt.

After the belt has been built up to the desired width the loose end of the ribbon 21 may be adhesively secured to the adjacent convolution. The mandrels may then be rotated while infra red heat is applied from a heater 48. The thermoplastic coating 22 is softened by heat applied from the heater 48 until the various convolutions of ribbon have been fused together in a unitary structure. If desired an additional coating of thermoplastic adhesive may be applied over the surface of the belt and heat applied to further bond the same.

The wound belt can be removed from the mandrels and subjected to heat and pressure to form a unitary structure.

After the belt has been formed as above described a layer of fabric 49 (Fig. 3) may be applied over the surface of the belt and secured thereto by the thermoplastic adhesive above mentioned, after which the belt may be turned inside out to bring the fabric layer on the inside of the belt. Alternatively the fabric layer may be wound on the mandrels first and the thermoplastic adhesive applied over the fabric layer to build up a wound belt with an inner fabric surface.

The belt may be built up to a desired width for use or a wide belt may be formed in the above manner and slit to form strips of the desired width.

If a two ply belt is desired the ribbon 21 may be laid flat against the mandrels 30 and 31, only one being shown in Fig. 7, and the ribbon advanced to wind a first layer 50 after which a layer of fabric 51 may, if desired, be applied and the ribbon fed in the reverse direction at the same rate or at different rates to form a second layer 52 in which the convolutions cross those of the first layer. This may be repeated to build up the belt to any desired number of plies. The belt may be heated to bond the thermoplastic adhesive after the completion of each layer or after the completion of the entire belt as desired, or the ribbon may be heated as it is wound onto the mandrel so as to bond the belt as it is formed. An additional layer of fabric may be applied to the outside of the belt shown in Fig. 7 if desired.

What is claimed is:

1. An endless belt comprising a flat ribbon composed of parallel multi-ply cords of prestretched dimensionally stable synthetic filaments bonded together by a plastisol, said flat ribbon helically wound in the form of successive partially overlapping convolutions, the plastisol of the contacting surfaces of adjacent convolutions fused together to bond the convolutions in a unitary structure in which the cords run in parallel relationship substantially longitudinally of the belt and a layer of fabric disposed over the surface of said belt and bonded thereto by said plastisol.

2. An endless belt as set forth in claim 1 in which the dimensionally stable synthetic filaments are composed of stretched and saponified continuous filaments of cellulose acetate.

References Cited in the file of this patent
UNITED STATES PATENTS

| | | |
|---|---|---|
| 1,129,666 | Gray | Feb. 23, 1915 |
| 1,412,309 | Lambert | Apr. 11, 1922 |
| 1,939,859 | Matthias | Dec. 19, 1933 |
| 1,964,510 | Goetter | June 26, 1934 |
| 2,141,796 | Loges | Dec. 27, 1938 |
| 2,239,635 | Walton | Apr. 22, 1941 |
| 2,377,650 | Reimel | June 5, 1945 |
| 2,522,722 | Mitchell | Sept. 19, 1950 |
| 2,526,324 | Bloomfield | Oct. 17, 1950 |
| 2,570,895 | Wilson | Oct. 9, 1951 |
| 2,734,012 | Downing | Feb. 7, 1956 |

FOREIGN PATENTS

| | | |
|---|---|---|
| 163,812 | Australia | July 4, 1955 |

OTHER REFERENCES

Organic Finishing, "Dispersion Coatings," December 1950, pages 11–15.